Patented Aug. 25, 1925.

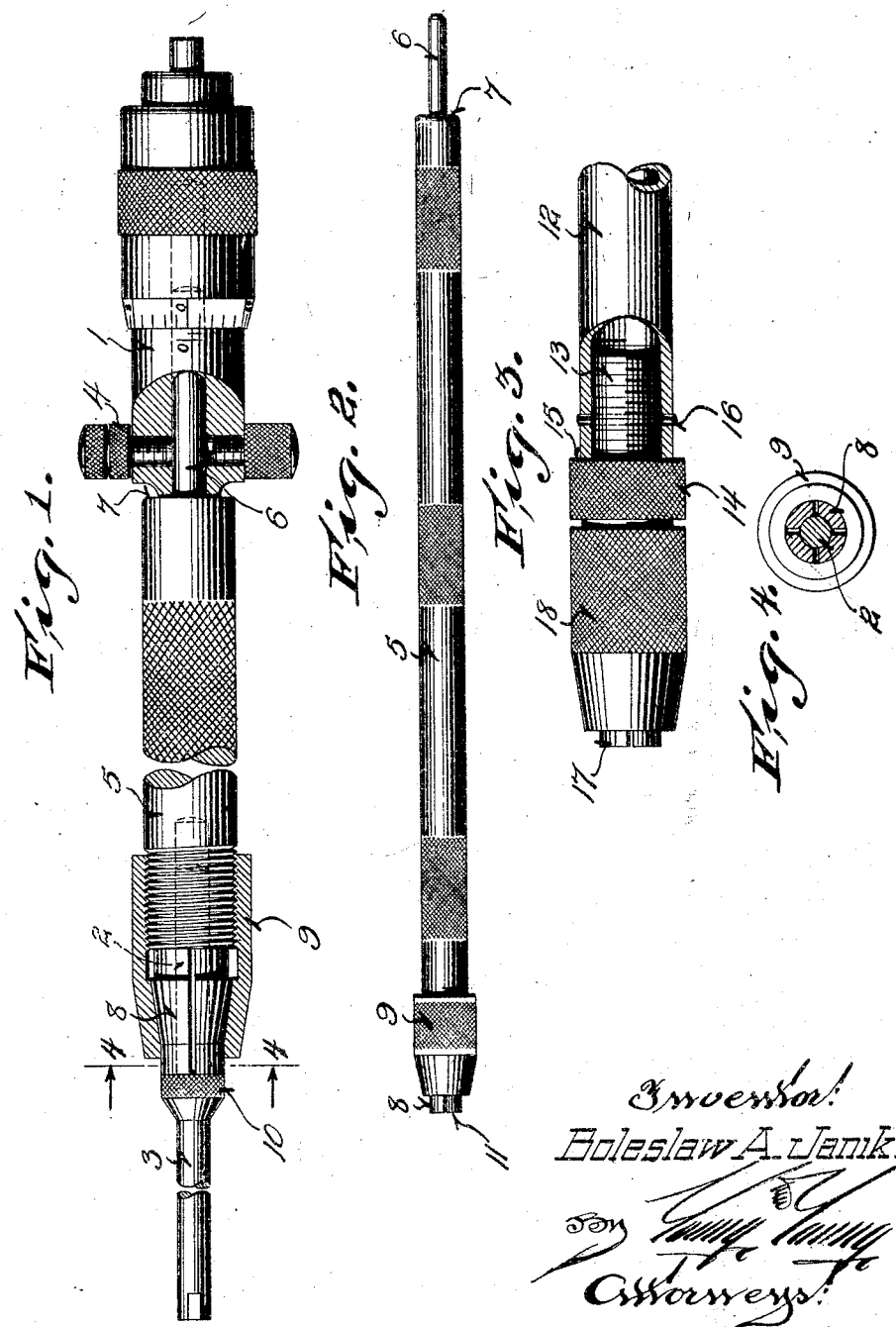

1,551,154

UNITED STATES PATENT OFFICE.

BOLESLAW A. JANIK, OF MILWAUKEE, WISCONSIN.

MICROMETER EXTENSION POST.

Application filed March 1, 1924. Serial No. 696,293.

*To all whom it may concern:*

Be it known that I, BOLESLAW A. JANIK, a citizen of the United States, and resident of Milwaukee, in the county of Milwaukee and State of Wisconsin, have invented certain new and useful Improvements in Micrometer Extension Posts; and I do hereby declare that the following is a full, clear, and exact description thereof.

This invention relates to micrometer extension posts.

Objects of this invention are to provide a micrometer extension post which is adapted to receive at its outer end a smaller post of a micrometer set, and to provide an accurate shoulder against which said posts may seat to thus adapt the micrometer to a widely varying series of measurements, so that one micrometer, equipped with one set of posts, may be used to accurately measure not only the distances for which its set is intended, but with the extension post, may be used with its initial set of posts to measure a widely increased distance.

Embodiments of the invention are shown in the accompanying drawings, in which:—

Figure 1 is a view partly in section of a micrometer equipped with the extension post located between the body of the micrometer and one of the set of posts.

Figure 2 is a view of the extension post detached.

Figure 3 is a fragmentary view of a modified form of post.

Figure 4 is a sectional view on the line 4—4 of Figure 1.

The micrometer body 1 is provided with a recess adapted to receive the shanks 2 of any one of a plurality of posts such as illustrated at 3, such shank being held in place by means of a set screw 4 in the usual manner. This adapts the micrometer to one range of measurements with its set of posts, but it does not adapt the micrometer for more than one range of measurement with a given post.

However, in practising this invention, an extension post 5 is provided which is equipped at one end with a shank 6 adapted to be received in the body portion 1 and to have its shouldered rear end 7 contact with the outer face of the body portion. At the other end of this extension post a plurality of jaws 8 are provided and the post is externally threaded to receive the clamping nut 9 for the jaws it being, of course, understood that the jaws and nut are properly tapered, as illustrated in Figure 1 to secure the necessary gripping action. This extension post is preferably provided with a plurality of knurled portions to provide gripping portions and also enhance its appearance. It is preferably made of hardened steel to resist wear.

In using the device the shank 6 of the extension post is positioned within the body portion 1 with the shouldered portion 7 thereof bearing firmly against the outer end of the body portion and with the shank held in place by the set screw 4. Any one of the set of posts 3 is inserted in the end of the extension post 5 with the shouldered or enlarged portion 10 of such member in intimate contact with the plain outer face 11 of the jaws 8. Thereafter, the nut 9 is tightened thus locking the shank in place.

In using the device, it will be noted that it is not necessary to loosen the set screw 4 for each substitution of the members 3 of the set, for the reason that the extension post may be left in place, and any one of the set of auxiliary posts may be set in the end of the extension post and the nut 9 quickly adjusted.

In the modified form shown in Figure 3, the solid post 5 is replaced by a tubular member 12 within which is threaded and pinned the shank 13 of a terminal member. This terminal member is provided with an enlarged portion 14 which is provided with a shoulder 15 adapted to bind against the outer end of the tube 12 when the shank 13 is screwed in place—a pin 16 being then passed through the tube and shank. The enlarged portion 14 of this terminal member is preferably knurled to provide a gripping portion, and such member is provided with a plurality of jaws 17. A clamping nut 18, similar to the nut 9, is employed for forcing the jaws into gripping engagement with an inserted shank.

It will thus be seen that an extension post for micrometers has been provided which is adapted to cooperate with the micrometer and with the set of auxiliary posts usually provided and to adapt this composite instrument to measurements in widely varying arrangement.

Although the invention has been described in considerable detail, it is to be understood that the invention may be variously embodied and is, therefore, to be limited only as claimed.

I claim:

The combination of a micrometer provided with a socketed portion and a set screw, an extension post having a shank adapted to be positioned within said socket and gripped by said set screw, said extension post having gripping jaws at its outer end and having a socket extending inwardly from such outer end, said jaws having finished outer ends, an auxiliary post having a shank positioned within said last mentioned socket, and means for causing said jaws to grip the shank of said auxiliary post, said auxiliary post having a collar adapted to contact with the finished outer ends of said jaws.

In testimony that I claim the foregoing I have hereunto set my hand at Milwaukee, in the county of Milwaukee and State of Wisconsin.

BOLESLAW A. JANIK.